(Model.)
2 Sheets—Sheet 1
J. W. RUHL.
HAY TEDDER.
No. 252,522.  Patented Jan. 17, 1882.
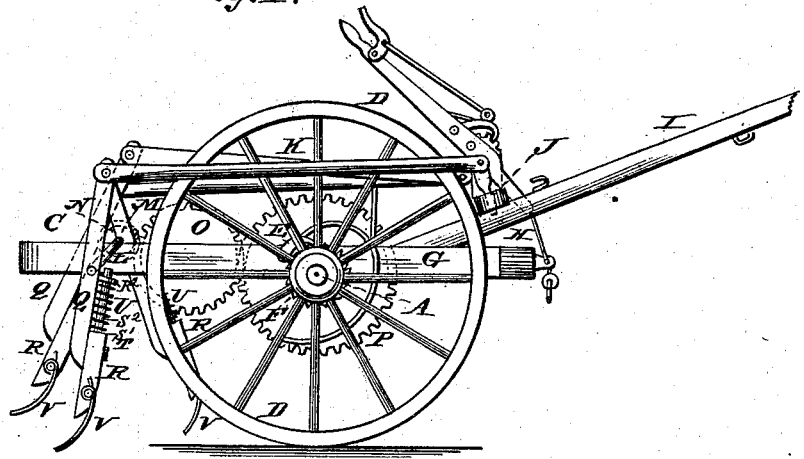
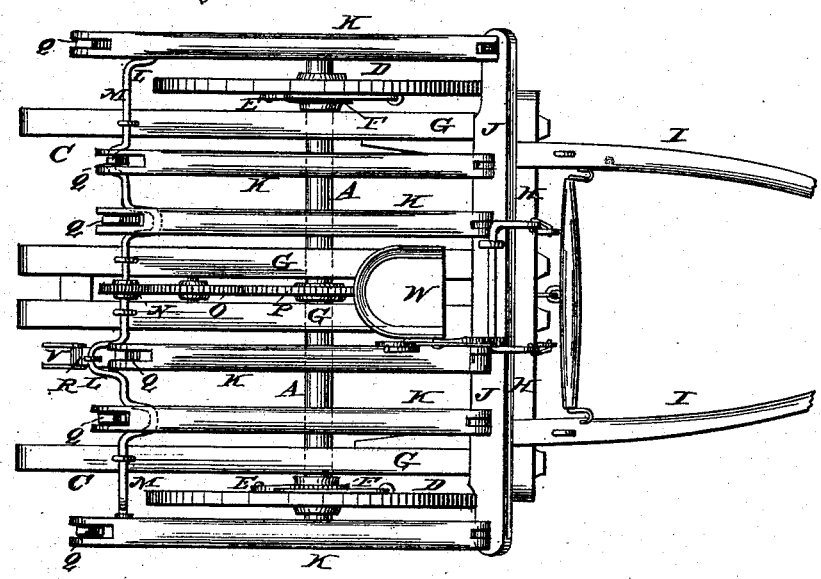
WITNESSES
INVENTOR (Model.)

2 Sheets—Sheet 2.

J. W. RUHL.
HAY TEDDER.

No. 252,522.

Patented Jan. 17, 1882.

WITNESSES

INVENTOR

UNITED STATES PATENT OFFICE.

JOHN W. RUHL, OF MIFFLINBURG, PENNSYLVANIA.

HAY-TEDDER.

SPECIFICATION forming part of Letters Patent No. 252,522, dated January 17, 1882.

Application filed September 14, 1881. (Model.)

*To all whom it may concern:*

Be it known that I, JOHN W. RUHL, of Mifflinburg, in the county of Union and State of Pennsylvania, have invented certain new and useful Improvements in Hay-Tedders; and I do hereby declare that the following is a full, clear, and exact description of the invention, which will enable others skilled in the art to which it appertains to make and use the same, reference being had to the accompanying drawings, which form a part of this specification.

Figure 4:
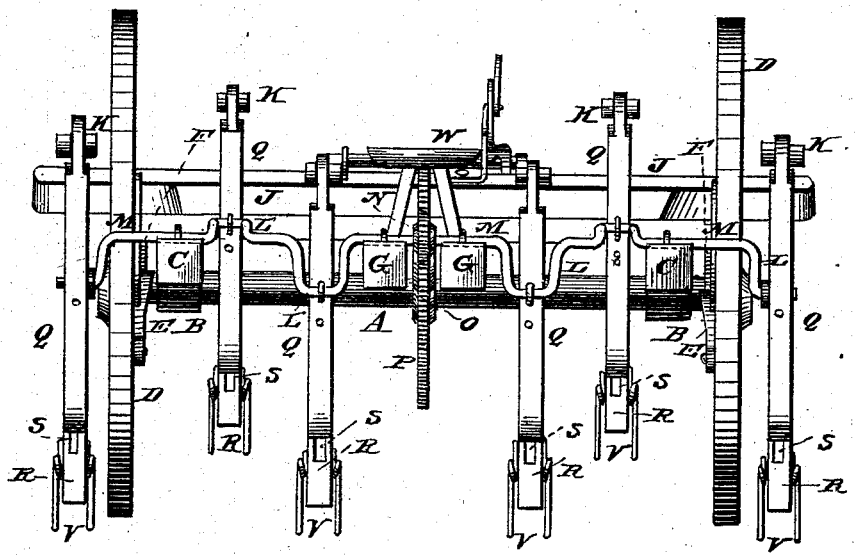
Figure 3:
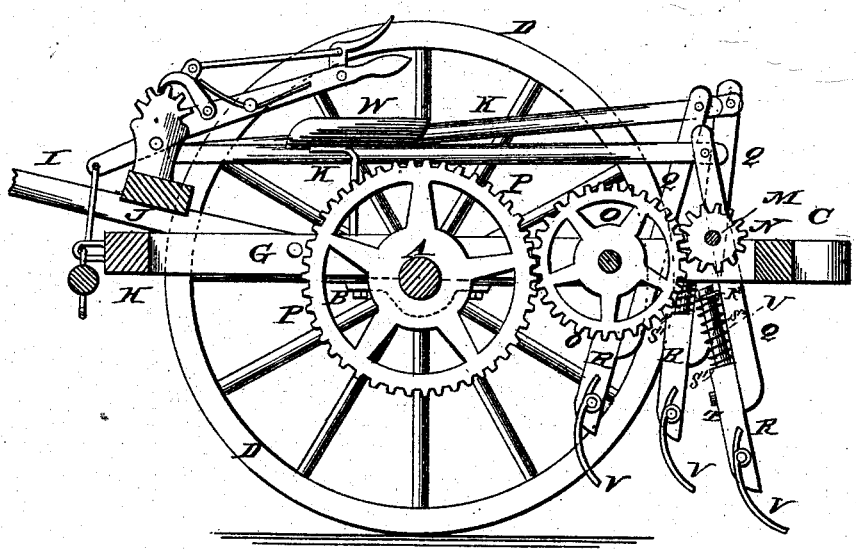
Figure 5:
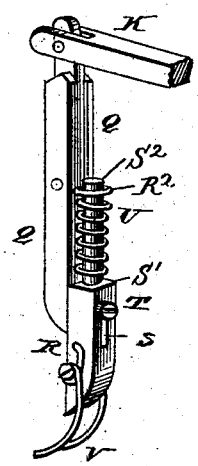

Figure 1 is a side view of my improved hay-tedder. Fig. 2 is a top plan of the same. Fig. 3 is a longitudinal sectional view. Fig. 4 is a rear elevation, and Fig. 5 is a detail view of one of the tedder-teeth.

Corresponding parts in the several figures are denoted by like letters of reference.

This invention relates to hay-tedders; and it consists in certain improvements in the construction of the same, which will be hereinafter fully described, and particularly pointed out in the claim.

In the drawings hereto annexed, A represents the axle, which is mounted in bearings B of the frame C, and supported by wheels D, which are provided with spring-pawls E, engaging ratchets F upon the said axle, so that the latter shall revolve or not according to the direction in which the machine is propelled upon its transporting-wheels.

The main frame of the machine consists of a series of longitudinal parallel beams, G G, connected by a transverse front beam, H.

I I are the thills which are pivoted to the outer beams, G, a short distance in front of the axle, and which are connected just above beam H by a transverse beam, J. To the latter are pivoted a series of rearwardly-projecting arms, K, which are individually connected by pivoted rods or arms Q to separate cranks L of a long transverse crank-shaft, M, mounted in suitable bearings upon the rear ends of the parallel beams G. The crank-shaft M is provided between the central beams, G, with a pinion, N, connected through an intermediate gear, O, with a gear-wheel, P, upon the axle, by which the crank-shaft and the tedder-arms are thus operated.

The tedder-arms, which are denoted by letter Q, are provided at their lower ends with vertically-sliding extensions R, having slots S moving upon studs T at the lower ends of arms Q. The extension-pieces R have shoulders S' and upwardly-projecting stems $S^2$ sliding in bails or brackets $R^2$ upon the rear side of arms Q, and springs U, coiled upon stems $S^2$, are interposed between said brackets and the shoulders S', to force the pieces R in a downward direction, and the said arms R are provided at their lower ends with forked projections or prongs V, to stir and scatter or spread the hay.

A seat, W, for the driver is suitably arranged upon the central frame-bars, G G, and a suitable lever mechanism of well-known construction is provided, by means of which the front ends of the frames may be adjusted vertically in relation to each other.

From the foregoing description, taken in connection with the drawings hereto annexed, the operation and advantages of my improved machine will be readily understood. The construction is simple and the device easily operated and adjusted to any uneven or hilly patches of ground. Furthermore, by the improved construction of the machine, as herein described, it will pick or remove from any furrows or depressions in the ground such stray hay as by other machines is left to waste, and this, on account of the flexible tedder-teeth, without any possibility of injury to the machine.

Having thus described my invention, I claim and desire to secure by Letters Patent of the United States—

The tedder-arms Q, having studs T and bails or brackets $Q^2$, in combination with the slotted extensions R, having shoulders S' and stems $S^2$ moving or sliding vertically upon studs T, and in brackets $R^2$, and having teeth or prongs V, and the springs U, coiled upon the stems $S^2$ between shoulders S' and brackets $R^2$, substantially as set-forth.

In testimony that I claim the foregoing as my own I have hereto affixed my signature in presence of two witnesses.

JOHN W. RUHL.

Witnesses:
A. G. ROHBACH,
C. W. THOMAS.